May 20, 1958  C. F. HEY ET AL  2,835,138
SPEED REDUCER GEAR DRIVES
Filed Oct. 19, 1955  7 Sheets-Sheet 1

May 20, 1958 C. F. HEY ET AL 2,835,138
SPEED REDUCER GEAR DRIVES
Filed Oct. 19, 1955 7 Sheets-Sheet 2

C. F. HEY ET AL 2,835,138

SPEED REDUCER GEAR DRIVES

Filed Oct. 19, 1955

May 20, 1958 C. F. HEY ET AL 2,835,138
SPEED REDUCER GEAR DRIVES

Filed Oct. 19, 1955 7 Sheets-Sheet 6

United States Patent Office 2,835,138
Patented May 20, 1958

2,835,138

SPEED REDUCER GEAR DRIVES

Charles F. Hey, Philadelphia, and Robert E. Richards, Abington, Pa., assignors to Link-Belt Company, a corporation of Illinois Application October 19, 1955, Serial No. 541,369

16 Claims. (Cl. 74—421)

This invention relates to new and useful improvements in speed reducer gear drives.

It is the primary object of this invention to provide speed reducer gear drives which may be quickly and easily assembled as either double reduction or triple reduction units by selectively employing in the assemblies either one of two gear set attachment units to provide the amount of speed reduction that is desired in advance of the final reduction gear set which is common to all assemblies.

A further important object of the invention is to provide speed reducer gear drives of the above mentioned type in which all of the gear sets for either a double reduction or a triple reduction drive may be assembled or disassembled relative to the housing through one end of the latter.

Another object of the invention is to provide double and triple reduction gear drives in each of which is employed the same basic housing structure having its power output end permanently closed, and with an internal, detachable spider spaced inwardly therefrom for cooperation with said permanently closed end to support and partition from the remainder of the housing the final reduction gear set, the said spider also functioning as a support for the initial reduction gear set of a double reduction drive and the initial and intermediate gear sets of a triple reduction drive.

A still further object of the invention is the provision of speed reducer gear drives of either the double reduction or the triple reduction type in each of which the power input and power output shafts are in axial alignment and an internal, detachable spider is employed for directly supporting the inboard end of the power output shaft and for supporting through a detachable attachment bracket the inboard bearing of the power input shaft, whereby the pinion element of the power input shaft and the gear element of the power output shaft are straddle-mounted in antifriction bearings.

Still another object of the invention is to provide a triple reduction gear drive in which the pinion of a countershaft is straddle-mounted in antifriction bearings carried by an attachment bracket detachably fastened to an internal spider located in the housing.

A further object of the invention is the provision of speed reducer gear drives of either the double reduction or triple reduction type in which the housing is provided with a detachably mounted internal spider for supporting the inboard antifriction bearing of the power output shaft and an attachment bracket is detachably mounted on the spider and functions to adjust the position of the said inboard bearing of the power output shaft in the spider.

Other objects and advantages of the invention will be apparent during the course of the following description:

In the accompanying drawings forming a part of this specification and in which like numerals are employed to designate like parts throughout the same.

Figure 1:
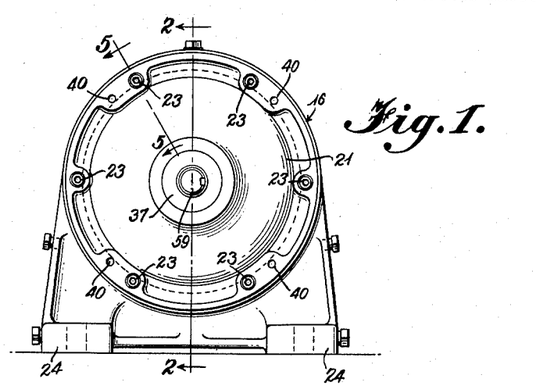
Figure 1 is an end elevational view of the power input end of a double reduction gear drive embodying the invention.
Figure 5:
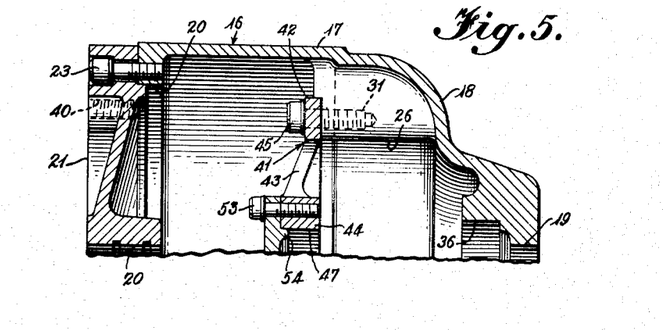
Figure 5 is a fragmentary, longitudinal sectional view taken on line 5—5 of Fig. 1.
Figure 6:
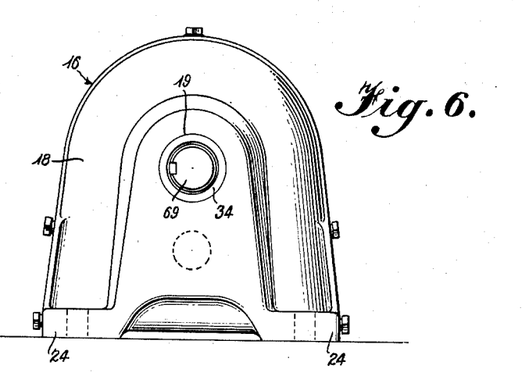
Figure 6 is an end elevational view of the power output end of the speed reducer gear drive shown in the preceding figures.

In the drawings, wherein for the purpose of illustration are shown the preferred embodiments of this invention, and first particularly referring to the double reduction gear drive of Figs. 1 to 8, inclusive, the reference character 16 designates in its entirety the housing of the gear drive. This housing includes a peripheral wall 17 to which is permanently attached an end wall 18 having formed therein a shaft opening 19. The opposite end of the housing 17 is formed with a large access opening 20 that is adapted to be closed by a detachable end wall cover plate 21. This cover plate is formed with a shaft opening 22 that is in axial alignment with the shaft opening 19 formed in the permanent end wall 18. Figs. 1 and 5 disclose the detachable end wall cover plate 21 as being secured to the housing body by a suitable number of screws 23. The housing body 16 is provided with four apertured feet 24 by means of which the gear drive may be anchored to any desired supporting surface.

As is best illustrated in Figs. 2 to 5, inclusive, the body of the housing is provided with three upper bosses 25, 26 and 27, and with two lower bosses 28 and 29. The center, upper boss 25 is formed with a hole 30 that is smooth surfaced to receive a dowel pin. The remaining bosses 26 to 29, inclusive, are formed with tapped holes 31. The two lower bosses 28 and 29 extend inwardly from the permanent end wall 18 of the housing and are interconnected by a strengthening web 32 and braced relative to the peripheral wall 17 of the housing by laterally extending the webs 33.

The shaft opening 19, formed in the permanent end wall 18 of the housing, is adapted to have fitted therein a suitable seal structure 34. An antifriction bearing unit, which may take the form of a tapered roller bearing, 35 is suitably fitted in the annular recess 36 which is formed in the permanent end wall 18 of the housing body.

The detachable end wall cover plate 21 has fitted in its shaft opening 22 a suitable seal structure 37 while a suitable antifriction bearing unit, such as a ball bearing assembly, 38 is mounted in the opening 22 and is retained in place by suitable snap rings 39.

By referring to Figs. 1 and 5, it will be seen that the detachable end cover plate 21 is provided with four tapped holes 40 which are employed to receive mounting screws for fastening a suitable motor supporting bracket or shelf directly to the gear drive housing 16 to form what is known in the trade as a motogear. In other words, in such a unit, the driving electric motor and the reducer gear drive are attached to the supporting surface by means of the feet 24 of the gear drive housing and the armature shaft of the motor and the power input shaft of the gear drive are connected by means of a suitable coupling. Another form of motogear unit may be provided by separately attaching the electric motor and the gear drive to a base plate with a suitable flexible coupling, or any other desired type of mechanical drive unit, connecting the shafts of the electric motor and the gear drive.

What is known in the trade as a gearmotor may be formed by removing the detachable end cover plate 21 and detachably fastening a flanged electric motor to the gear drive housing 16 by means of the screws 23. Therefore, in a gearmotor assembly the end plate of the electric motor takes the place of the detachable end cover plate of a motogear assembly and the claims should be so construed.

By particularly referring to Figs. 2, 3, 5 and 7, it will be seen that the housing body 16 has positioned therein a spider which will be designated in its entirety by the reference character 41. This spider includes a ringlike peripheral portion 42 radially inwardly from which extend a plurality of arms 43 for connecting an inner ringlike portion 44 to the peripheral portion 42.

This spider is detachably mounted on the bosses 25 to 29, inclusive, for bodily removal from the housing through the large end opening 20, by means of the anchoring screws 45. A dowel pin 46 is suitably fastened to the upper center of the spider and enters the smooth surfaced hole 30, formed in the boss 25 for initially positioning the spider in its proper location during assembly.

The inner ringlike portion 44 of the spider defines a shaft opening 47 in which is mounted an antifriction bearing unit, such as a tapered roller bearing, 48. It will be noted that this shaft opening 47 and bearing unit 48 are in axial alignment with the shaft openings 19 and 22 and the bearing units 35 and 38 of the permanent end wall 18 and the detachable end wall cover plate 21.

The lower portion of the spider is so shaped as to provide a shaft opening 49 in which is mounted an antifriction bearing unit, such as the ball bearing assembly, 50.

A detachable attachment bracket 51 is connected to the inner ringlike portion 44 of the spider for removal from the housing 16 through its open end 20 when the end wall cover plate 21 is removed. The screws 53 are employed for fastening this bracket to the spider. The attachment bracket 51 has formed on the inner face thereof an annular projection 54 that will fit in the shaft opening 47 formed in the spider 41 and will function, with one or more shims, for properly positioning the antifriction bearing unit 48 in the shaft opening 47.

A shaft opening 55 is formed in the center of the attachment bracket 51 for receiving the antifriction bearing unit, such as the ball bearing assembly, 56. This shaft opening 55 is in axial alignment with the shaft openings 19 and 22 for the permanent end wall 18 and the detachable end wall cover plate 21, respectively, while the bearing unit 56 is axially aligned with the bearing units 35 and 38, respectively, in said end walls.

A retainer plate 57 is secured by means of the screws 58 to the low portion of the spider 41 for the purpose of retaining in place the antifriction bearing unit 50 fitted in the shaft opening 49.

Figure 2:
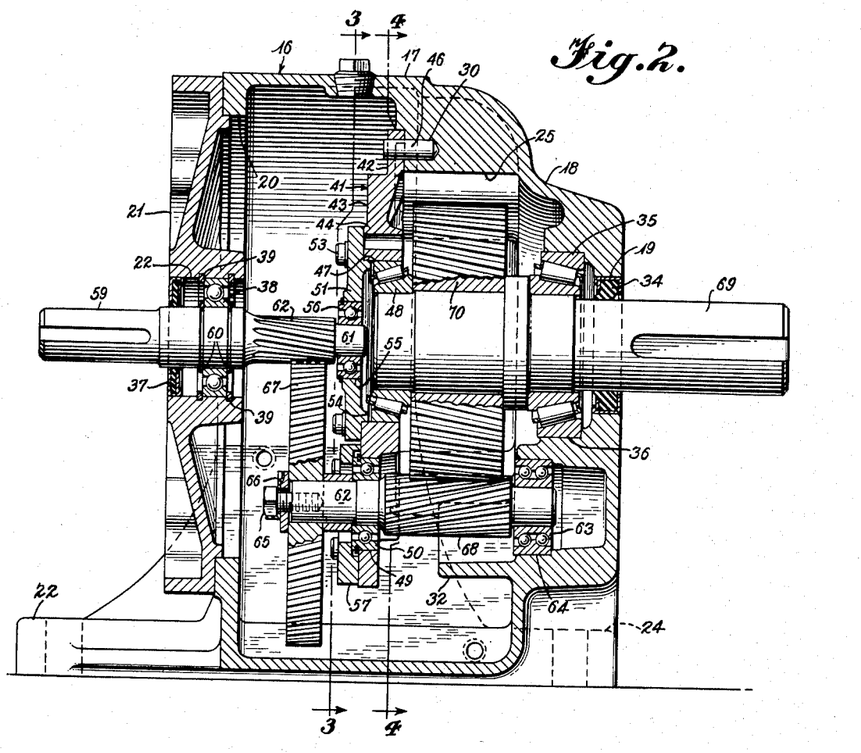
Figure 2 is a longitudinal vertical sectional view taken on line 2—2 of Fig. 1.
Figure 3:
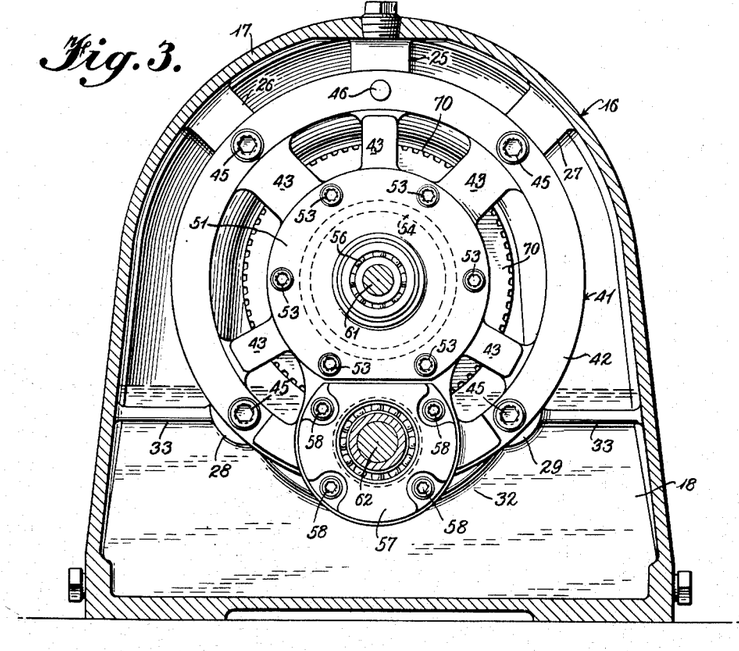
Figure 3 is a transverse, vertical sectional view taken on line 3—3 of Fig. 2.
Figure 4:
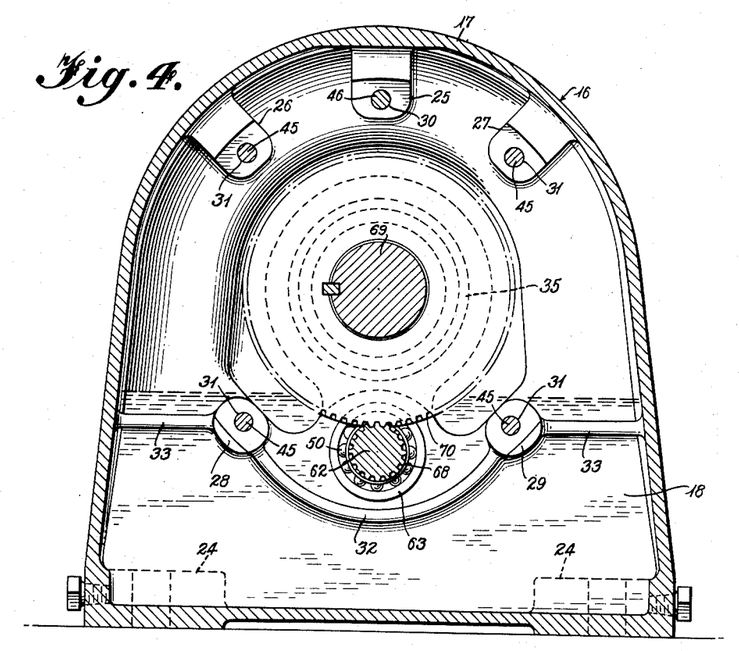
Figure 4 is a transverse, vertical sectional view taken on line 4—4 of Fig. 2.
Figure 8:
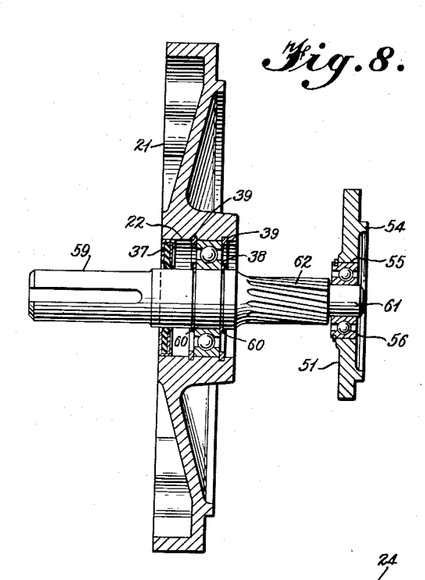
Figure 8 is a vertical sectional view showing the detachable cover plate, the power input shaft with its driving pinion and the detachable attachment bracket, all being adapted to be associated with the assembly of Fig. 7 for forming a double reduction gear drive.
Figure 9:
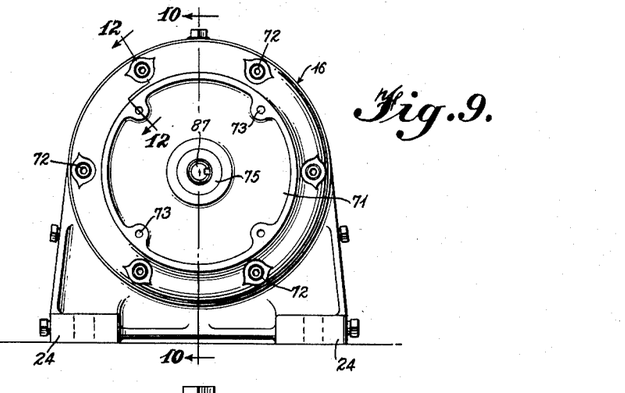
Figure 9 is an end elevational view of the power input end of a triple reduction gear drive embodying the invention.

Referring particularly to Figs. 2 and 8, it will be seen that the power input shaft 59 is journaled, intermediate its ends, in the antifriction bearing unit 38 that is mounted in the removable end wall cover plate 21. Snap rings 60 are employed for properly positioning the power input shaft 59 in the bearing unit 38. The inner, reduced end portion 61 of the power input shaft is journaled in the antifriction bearing unit 56 that is mounted in the attachment bracket 51. Straddle-mounted between the two antifriction bearing units 38 and 56, the power input shaft 59 has a helical pinion 62.

By further considering Figs. 2 and 8, it will be appreciated that the elements shown in Fig. 8 can be assembled relative to the gear drive housing 16 by first securing the attachment bracket 51, with its antifriction bearing unit 56 in place, to the spider 41 and then by assembling the cover plate 21 and power input shaft 59 with the reduced end 61 of the input shaft 59 inserted in the antifriction bearing 56 carried by the attachment bracket 51.

Figure 7:
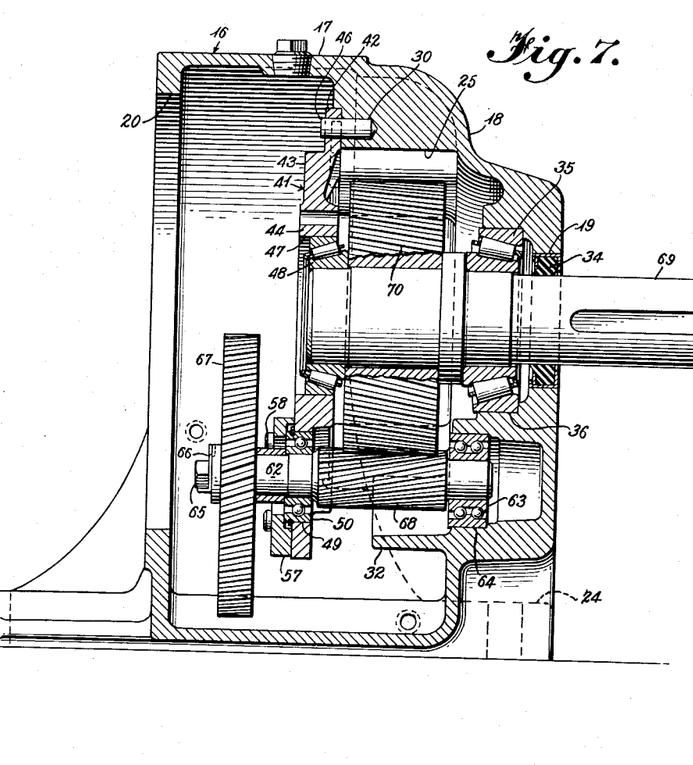
Figure 7 is a similar view to Fig. 2 and illustrates the basic housing structure and the gearing used in, or common to, both the double reduction and triple reduction gear drives.

Figs. 2 and 7 disclose a countershaft 62 journaled at one end portion in the antifriction bearing unit 50, that is carried by the spider 41, and at its other end portion in the antifriction bearing unit 63, which may take the form of a ball bearing assembly, fitted in the pocket 64 that is formed in the permanent end wall 18 of the housing. The countershaft 62 has detachably mounted thereon, by means of the screw 65 and the lock washer 66, the helical gear 67 that meshes with the pinion 62 of the power input shaft 59. Straddle-mounted between the antifriction bearing units 50 and 63, the countershaft 62 has formed thereon the pinion 68.

The power output shaft 69 is journaled, intermediate its ends, in the antifriction bearing unit 35 and at its inboard end portion in the antifriction bearing unit 48 that is mounted in the spider 41. Straddle-mounted between the two mentioned antifriction bearing units, the power output shaft 69 has thereon the helical gear 70 which meshes with the pinion 68 on the countershaft 62.

Figure 10:
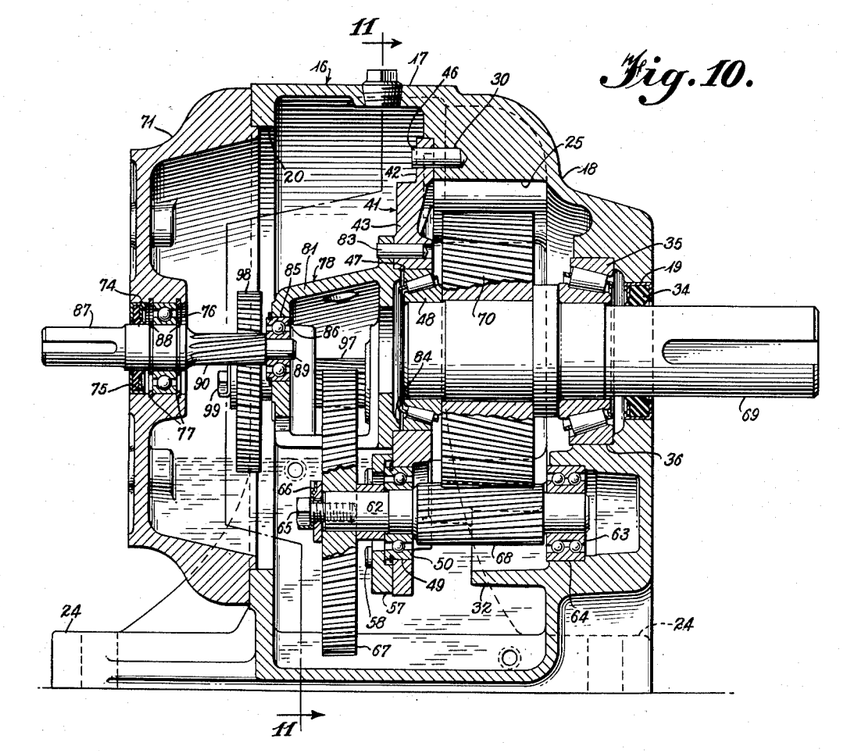
Figure 10 is a longitudinal vertical sectional view taken on line 10—10 of Fig. 9.

Figures 9 to 15, inclusive, disclose the speed reducer gear drive when assembled as a triple reduction unit. By comparing Figs. 10 and 7, it will be seen that all of the elements disclosed in Fig. 7 are embodied in the assembly of Fig. 10. The triple reduction drive of Fig. 10 is created by substituting the subassembly illustrated in Fig. 14 for the subassembly illustrated in Fig. 8. Because all of the elements illustrated in Fig. 7 are present in the embodiment of the invention shown in Figs. 9 to 15, inclusive, the same reference characters will be applied to all corresponding elements. Therefore, the only new elements to be described in connection with the triple reduction gear drive are those that are illustrated in detail in their subassembly relation in Fig. 14.

Figure 14:
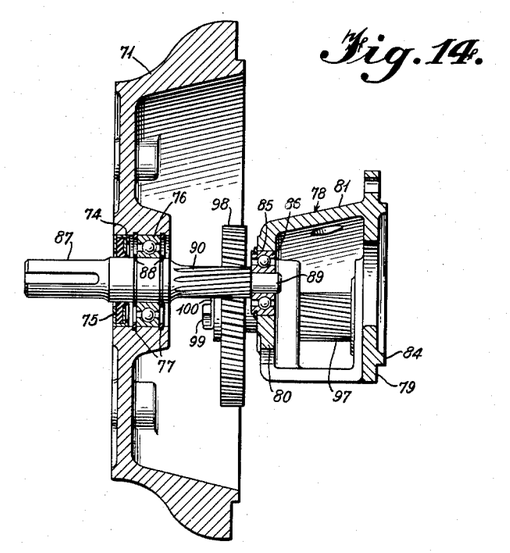
Figure 14 is a similar view to Fig. 8 but discloses the detachable end cover plate, the power input shaft with its driving pinion, and the detachable attachment bracket, all being adapted to be associated with the assembly shown in Fig. 7 for producing a triple reduction gear drive.

The removable end wall cover plate 71 is detachably secured to the open end of the housing 16 by means of the screws 72. For the purpose of securing a supporting bracket or shelf for an electric motor to this triple reduction gear assembly, the detachable end wall cover plate is provided with a suitable number of tapped holes 73.

The end wall cover plate 71 has a shaft opening 74 in which are positioned a suitable seal 75 and an antifriction bearing unit, which may take the form of a ball bearing assembly, 76. The antifriction bearing unit is secured in its proper position within the shaft opening 74 by means of the snap rings 77. It will be noted by considering Fig. 10 that the shaft opening 74 is in axial alignment with the shaft opening 19 formed in the permanent end wall 18 of the housing body.

The attachment bracket of this triple reduction gear drive takes the form of a casting 78 that is made up of a base plate portion 79, a parallel, spaced mounting plate portion 80 and a peripheral wall portion 81.

Figure 11:
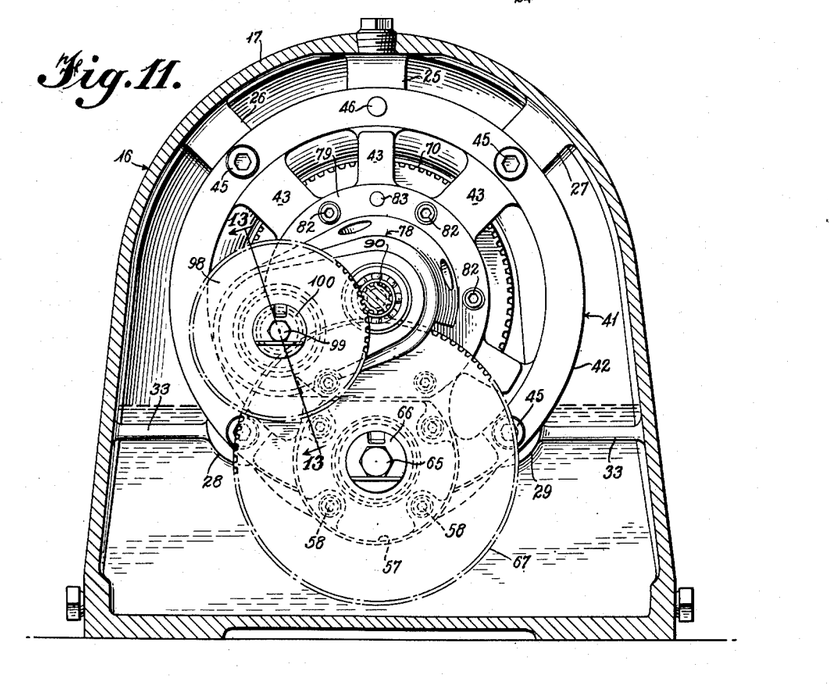
Figure 11 is a transverse, vertical sectional view taken on line 11—11 of Fig. 10.
Figure 12:
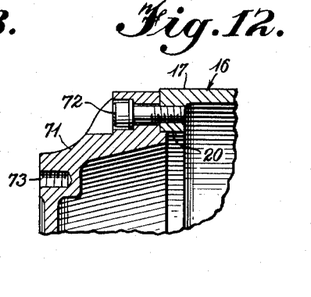
Figure 12 is a fragmentary sectional view taken on line 12—12 of Fig. 9.

Figure 11 discloses the attachment bracket 78 as being secured to the spider 41 by means of the screws 82. A dowel pin 83 is employed for initially positioning the attachment bracket during its assembly. The base plate 79 of the attachment bracket is provided with an annular projection 84 that is illustrated in Fig. 10 as entering the shaft opening 47 of the spider 41 to properly position, with the assistance of suitable shims, the anti-friction bearing unit 48 that is located in this shaft opening 47.

The outer plate portion 80 of the attachment bracket 78 is provided with a shaft opening 85 that has mounted therein an antifriction bearing unit, such as a ball bearing assembly, 86. This shaft opening 85 is in axial alignment with the shaft opening 74 of the detachable end wall cover plate 71, and with the shaft opening 19 of the permanent end wall 18 of the drive housing. The power input shaft 87 is journaled, intermediate its ends, in the antifriction bearing unit 76 and is retained in proper relationship with this bearing unit by the snap rings 88. The inner, reduced end 89 of this input shaft 87 is journaled in the antifriction bearing unit 86 mounted in the attachment bracket outer plate 80. Straddle-mounted between the antifriction bearing units 76 and 86, the power input shaft 87 is provided with a helical pinion 90.

Figure 13:
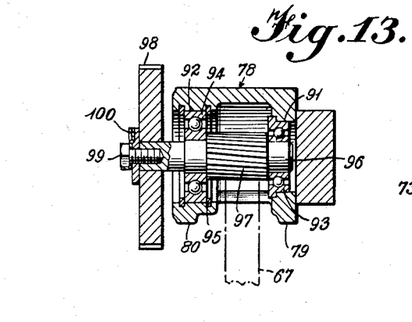
Figure 13 is a fragmentary sectional view taken on line 13—13 of Fig. 11.
Figure 15:
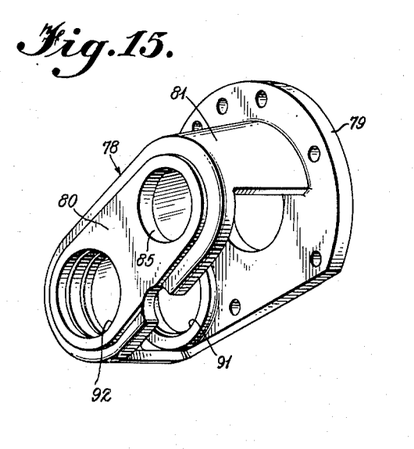
Figure 15 is a perspective view of the attachment bracket for the triple reduction gear drive.

As is best illustrated in Figs. 13 and 15, the attachment bracket 78 is provided with two axially aligned shaft openings 91 and 92 which are formed, respectively, in the base plate 79 and in the outer mounting plate 80 of the attachment bracket.

An antifriction bearing unit, such as the ball bearing assembly, 93 is mounted in the shaft opening 91. An antifriction bearing unit, such as the ball bearing assembly, 94 is mounted in the shaft opening 92. Snap rings 95 are employed for retaining the antifriction bearing unit 94 in its proper position within the shaft opening 92.

A countershaft 96 is journaled in the antifriction bearing units 93 and 94. Straddle-mounted between these antifriction bearing units, the countershaft 96 is provided with a helical pinion 97. Detachably secured to the outboard end of the countershaft 96 is a helical gear 98. The screw 99 and lock washer 100 retain this gear 98 in position on the countershaft.

When the elements shown in Fig. 14 are properly assembled relative to the remainder of the gear drive, the pinion 90 of the power input shaft 87 meshes with the gear 98 of the countershaft 96 and the pinion 97 of this latter shaft meshes with the gear 67 of the basic assembly. There is thus added to the double reduction drive of Fig. 2 a third speed reduction gear set which is provided primarily by the countershaft 96 and its pinion and gear 97 and 98, respectively.

The elements of the subassembly specifically illustrated in Fig. 14 may be added to the basic elements of Fig. 7 by first mounting the attachment bracket 78 on the spider 41 and by then attaching the end wall cover plate 71, with its power input shaft 87, to the gear drive housing. Disassembly of the elements of Fig. 14 can be accomplished by reversing the above assembly procedure.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, we claim:

1. A speed reducer gear drive comprising a housing body having end walls formed with axially aligned shaft openings, a spider detachably mounted in the housing body intermediate said end walls, an attachment bracket detachably mounted on said spider, said spider and attachment bracket having shaft openings in axial alignment with each other and with the shaft openings in the two end walls of the housing body, antifriction bearings positioned in the shaft openings of said housing body end walls, said attachment bracket and said spider, a first shaft journalled in the bearings of one of said end walls and said attachment bracket, a second shaft journaled in the bearings of the other of said end walls and the spider, a pinion on the first of said shafts, a gear on the second of said shafts, and gearing means mounted in the housing body and drivingly interconnecting the pinion and the gear to effect a plurality of speed reductions in transmitting power from the first shaft having the pinion to the second shaft having the gear.

2. A speed reducer gear drive as defined in claim 1 further characterized by one of the end walls of the housing body being detachable, and the spider being detachable from its mounting in a direction for removal from the housing body through the end of the latter left open by the removal of the detachable end wall.

3. A speed reducer gear drive as defined in claim 1 further characterized by one of the end walls of the housing being detachable, and the attachment bracket being detachable from the spider in a direction for removal from the housing body through the end of the later left open by the removal of the detachable end wall.

4. A speed reducer gear drive as defined in claim 3 further characterized by the spider being detachable from its mounting in a direction for removal from the housing body through the end of the latter left open by the removal of the detachable end wall.

5. A speed reducer gear drive as defined in claim 4 further characterized by two additional axially aligned antifriction bearings supported in the spider and the permanent end wall of the housing body, and the gearing means including a shaft journaled in the said two additional bearings and projecting from the spider opening in the direction of the removable end wall, a pinion on the last mentioned shaft between its supporting bearings, and a gear on the said projecting end of the shaft.

6. A speed reducer gear drive as defined in claim 5 further characterized by a plate detachably mounted on the removable end wall side of the spider for retaining in place the additional antifriction bearing that is supported in the spider, and means for detachably fastening the gear on the said projecting end portion of the shaft.

7. A speed reducer gear drive as defined in claim 3 further characterized by the said first shaft and the attachment bracket being removable from the housing body through the end of the latter left open by the removal of the detachable end wall.

8. A speed reducer gear drive as defined in claim 5 further characterized by the said first shaft and the attachment bracket being removable from the housing body through the end of the latter left open by the removal of the detachable end wall without disturbing the detachable spider, the shaft journaled in the said two additional antifriction bearings supported in the spider and the permanent end wall, and the gear on the projecting end portion of the last mentioned shaft.

9. A speed reducer gear drive comprising a housing body having one permanent end wall and one removable end wall, said walls having axially aligned shaft openings, a spider detachably mounted in the housing body intermediate said end walls, an attachment bracket detachably mounted on said spider, said spider and attachment bracket having shaft openings in axial alignment with each other and with the shaft openings in the two end walls of the housing body, antifriction bearings positioned in the shaft openings of said housing body end walls, said attachment bracket and said spider, a power input shaft journaled in the bearings of the removable end wall and the attachment bracket, a power output shaft journaled in the bearings of the permanent end wall and the spider, a pinion on the power input shaft between its two supporting bearings, a gear on the power output shaft between its two supporting bearings, and gearing means comprising two portions supported respectively by one solely the attachment bracket and the second jointly by the permanent end wall and the spider and drivingly interconnecting the pinion on the power input shaft and the gear on the power output shaft to effect a plurality of speed reductions in transmitting power from the input shaft to the output shaft.

10. A speed reducer gear drive as defined in claim 9 further characterized by the gearing means including a first countershaft supported solely by the attachment bracket and a second countershaft supported by the spider and the permanent end wall of the housing body.

11. A speed reducer gear drive as defined in claim 10 further characterized by the first countershaft having an end portion projecting from the attachment bracket toward the removable end wall, and the second countershaft having an end portion projecting from the spider toward the removable end wall.

12. A speed reducer gear drive as defined in claim 11 further characterized by the attachment bracket having parallel spaced walls, a pair of axially aligned antifriction bearings supported by said spaced walls in which the said first countershaft is journaled, a pair of axially aligned antifriction bearings supported by said spider and the permanent end wall of the housing body in which the said second countershaft is journaled, a gear on the projecting end portion of the first countershaft meshing with the pinion on the power input shaft, a pinion on the first countershaft between its two supporting bearings, a gear on the projecting end portion of the second countershaft meshing with the pinion on the first countershaft, and a pinion on the second countershaft between its two supporting bearings and meshing with the gear on the power output shaft.

13. A speed reducer gear drive comprising a housing body having end walls formed with axially aligned shaft openings, a spider detachably mounted in the housing body intermediate said end walls, an attachment bracket detachably mounted on said spider, said spider having a shaft opening in axial alignment with the shaft openings in the two end walls of the housing body, antifriction bearings positioned in the shaft openings of said housing body end walls and said spider, a first shaft journaled in the bearing of one of said walls, a second shaft journaled in the bearings of the other of said end walls and the spider, a pinion on one of said shafts, a gear on the other of said shafts and gearing means mounted in the housing body and drivingly interconnecting the pinion and the gear to effect a plurality of speed reductions in transmitting power from the shaft having the pinion to the shaft having the gear, the detachable attachment bracket having means extending into the spider shaft opening for properly positioning and retaining the antifriction bearing therein.

14. A speed reducer gear drive comprising a housing body having end walls formed with axially aligned shaft openings, a spider detachably mounted in the housing body intermediate said walls, an attachment bracket detachably mounted on said spider, said spider having a shaft opening in axial alignment with the shaft openings in the two end walls of the housing body, antifriction bearings positioned in the shaft openings of said housing body end walls and said spider, a first shaft journaled in the bearing of one of said end walls, a second shaft journaled in the bearings of the other of said end walls and the spider, a pinion on one of said shafts, a gear on the other of said shafts, and gearing means mounted in the housing body and drivingly interconnecting the pinion and the gear to effect a plurality of speed reductions in transmitting power from the shaft having the pinion to the shaft having the gear, one of the end walls of the housing being detachable, the attachment bracket being detachable from the spider in a direction for removal from the housing body through the end of the latter left open by the removal of the detachable end wall, the spider being detachable from its mounting in a direction for removal from the housing body through the end of the latter left open by the removal of the detachable end wall.

15. A speed reducer gear drive comprising a housing body having one permanent end wall and one removable end wall, said walls having axially aligned shaft openings, a spider detachably mounted in the housing body intermediate said end walls, an attachment bracket detachably mounted on said spider, said spider having a shaft opening in axial alignment with the shaft openings in the two end walls of the housing body, antifriction bearings positioned in the shaft openings of said housing body end walls and said spider, a power input shaft journaled in the bearing of the removable end wall, a power output shaft journaled in the bearings of the permanent end wall and the spider, a pinion on the power input shaft, a gear on the power output shaft, and gearing means supported respectively by the attachment bracket and by the permanent end wall and the spider and drivingly interconnecting the pinion on the power input shaft and the gear on the power output shaft to effect a plurality of speed reductions in transmitting power from the input shaft to the output shaft, the attachment bracket being mounted on the side of the spider facing toward the removable end wall and including two parallel spaced walls, and the gearing means including a countershaft journaled in the said spaced walls and having an end portion projecting from the attachment bracket toward the removable end wall, a gear on the projecting end portion of the countershaft and meshing with the pinion on the power input shaft, a pinion on the portion of the countershaft between the said spaced walls of the attachment bracket, and the attachment bracket being detachable as a unit from the spider with the journaled countershaft and its gear and pinion in a direction for removal from the housing body through the end of the latter left open by the removal of the end wall.

16. A speed reducer gear drive as defined in claim 15 further characterized by the said gear means also including a second countershaft journaled in the spider and the permanent end wall and having a gear meshing with the pinion on the first mentioned countershaft and a pinion meshing with the gear on the power output shaft.

References Cited in the file of this patent

UNITED STATES PATENTS

| | | |
|---|---|---|
| 1,949,643 | Bannan | Mar. 6, 1934 |
| 2,170,548 | Christian | Aug. 22, 1939 |
| 2,600,697 | Schmitter | June 17, 1952 |